Dec. 1, 1931.  H. CHARTRAND  1,834,680
MIXING VALVE
Filed Sept. 16, 1929
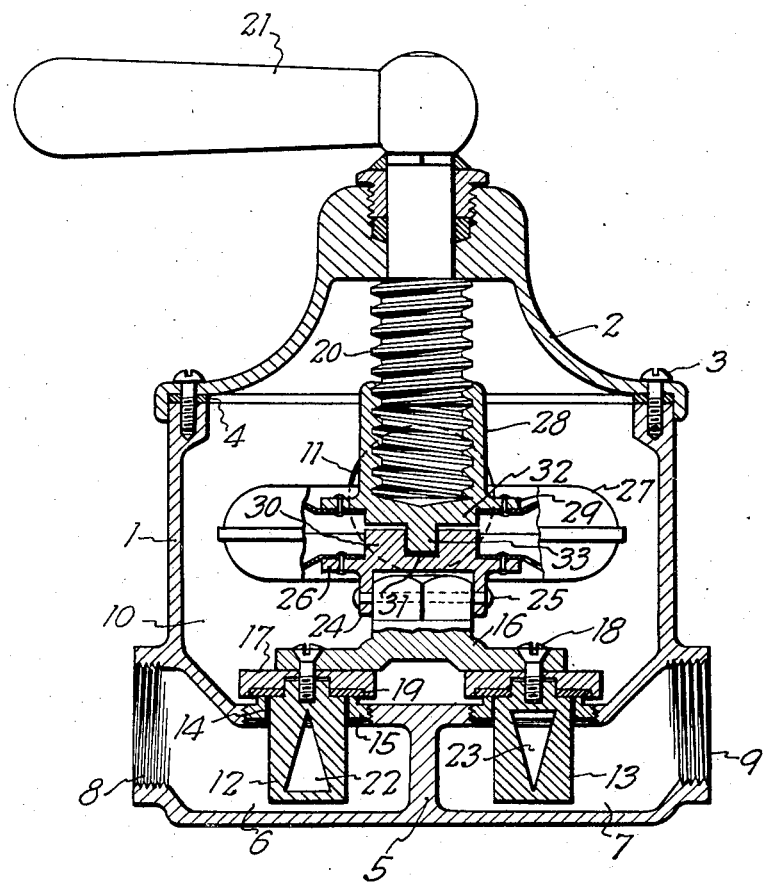
Inventor
Harry Chartrand Patented Dec. 1, 1931

1,834,680

UNITED STATES PATENT OFFICE

HARRY CHARTRAND, OF CHICAGO, ILLINOIS

MIXING VALVE

Application filed September 16, 1929. Serial No. 393,016.

This invention relates to an improved mixing valve.

In the operation of a mixing valve it is assumed that the hot and cold water will be supplied at certain moderate temperatures, but often it happens that the hot water reaches a scalding temperature, and it is desired to make provision for such an emergency and avoid serious injuries. It is therefore the principal object of my invention to provide a mixing valve which is arranged in the event the hot water is supplied at an extereme temperature to automatically cut down the amount of hot water supplied and increase the amount of cold water and thereby moderate the temperature of the water delivered.

Briefly stated, I provide a thermostatically expansible connection between the cross-head yoke member, which operates the graduating plugs of the valve, and a collar threading on the hand-operated stem of the valve, so that no matter how far the plugs have been withdrawn they will be returned sufficiently to keep the water delivered from the valve at a moderate temperature even though the hot water supplied might happen to be at an extreme temperature. The thermostatically expansible connection is preferably formed by a double concave, wafer type thermostat, one side of which is secured to the cross-head and the other side to the collar, thus making a simple, compact and extremely practical construction. In order to relieve the thin walled thermostat of any torsional strains incident to the threading of the stem in the collar, I prefer to provide a coupling between the cross-head and the collar inside the thermostat, the said coupling having the members thereof interfitting in such a way that the coupling does not interfere with the free expansion and contraction of the thermostat and still maintains a positive operating connection between the cross-head and the collar at all times.

The invention is illustrated in the accompanying drawing showing a central vertical section through a mixing valve embodying the features referred to.

The valve comprises the usual hollow cylindrical casing 1 open only at the outer end where the cover plate 2 is provided to close the same. Screws 3 fasten the cover in place and a suitable gasket 4 insures a water-tight joint. The casing has the inner portion thereof divided by a partition wall 5 into two chambers 6 and 7 into the former of which hot water is arranged to be supplied through a pipe connection at 8 while another pipe connection at 9 supplies cold water to the other chamber. The hot and cold water is supplied from the chambers 6 and 7, respectively, in graduated amounts to a mixing chamber 10 which has the usual discharge or delivery pipe connection at 11, as is well known in the art. Graduating plugs 12 and 13 are operable in openings 14 provided in valve seats 15 preferably threaded in place in the casing as shown. The plugs 12 and 13 are mounted on a cross-head 16 along with valve disks 17, the plugs and disks being secured to the opposite ends of the cross-head suitably by means of screws 18. It will be observed that the valve disks are counter-sunk centrally to receive the reduced extensions of the plugs and that washers 19 of suitable packing material fit about the reduced extensions of the plugs and are held in place between the plugs and disks, these washers serving to insure a leak-proof joint between the valve disks and their seats when the valve is closed. It is well known that ordinarily the cross-head 16 has the threaded stem 20 threaded directly therein or at least in a rigid extension thereof, the stem 20 being arranged to be turned by means of a handle 21 fastened on the outer end thereof. Thus, when the stem is turned in the proper direction to cause withdrawal of the plugs 12 and 13 from the openings 14 there is first a delivery of nothing but cold water because of the form and relation of the ports 22 and 23 in the plugs 12 and 13, respectively. Thereafter, as the plugs are withdrawn more and more there is a gradual cutting down of the cold water and a gradual increasing in delivery of hot water until finally the cold water is cut off entirely and there is a full delivery of hot water. Manifestly, a valve constructed as thus far described has no provision for preventing scalding in the event the hot water supplied reaches an extreme temperature. I shall now describe how, in accordance with my invention, by simply adding a thermostatically expansible connection between the cross-head 16 and the part threading on the stem 20, the graduating plugs 12 and 13 are arranged to be operated automatically to prevent the delivery of water from the mixing valve at scalding temperatures.

The cross-head 16 has a collar 24 suitably secured thereto, as by means of a pin 25. The collar 24 has a flange 26 by means of which the same is fastened to one side wall of a double concave wafer type thermostat 27. The latter may be filled with ether or the like and is arranged when heated sufficiently to expand from the double concave form to a substantially flat form or even a double convex form, depending on the construction thereof and the amount of movement which it is desired to communicate to the graduating plugs, as will presently be described. An internally threaded collar 28 has the stem 20 threading therein as shown and has an annular flange 29 similar to the flange 26 by means of which the same is fastened to the other side wall of the thermostat 27. Obviously, when the stem 20 is turned in the proper direction, the cross-head 16 will be withdrawn with reference to the valve seats 15 in substantially the same way as in the ordinary unimproved type of mixing valve to which reference was made above, the thermostat 27 simply completing the connection between the collar 28 and the cross-head 16 to communicate the pull of the collar 28 to the cross-head. Naturally, it requires very little force to move the cross-head in this direction and the thermostat 27, even though of thin walled construction, is equal to the task and there is no danger of its being damaged by such operation. I prefer, however, to provide a coupling between the collars 24 and 28 inside the thermostat so as to relieve the latter of any torsional strains incident to the threading of the stem in the collar 28, either in the opening or closing of the valve. Thus, I provide the collar 24 with an extension 30 slotted transversely on the end thereof, as indicated at 31, and provide the collar 28 with an extension 32 having a projecting key 33 to fit freely in the slot 31. In this way the collar 28 has a positive connection with the collar 24 and still the latter is movable easily with reference to the former as necessitated in the expansion and contraction of the thermostat 27. The key 33 and its slot 31 are of the proper dimensions to remain coupled in any degree of expansion of the thermostat. The coupling enables the disks 17 to be forced down tightly on the seats 15 without danger of damaging the thermostat.

In operation, it is believed to be evident from the foregoing that as long as the hot water is delivered at a normal temperature there will be no difference in the operation of this valve from that of other mixing valves; the thermostat permits the plugs 12 and 13 to be pulled out and pushed back in the same way as if the cross-head 16 had a direct threaded connection with the stem 20. However, assuming that the plugs are occupying a certain position where hot water is being delivered along with a little cold water, and there is an unexpected rise in temperature of the hot water such that if the valve were not promptly adjusted the user would get scalded, then the thermostat 27 comes into play, and makes the necessary adjustment of the valve automatically even before the user notices the rise in temperature. In other words, the user is protected absolutely from harm and furthermore, is spared the bother of adjusting the valve. It should, of course, be evident that usually there would not be a sufficient opportunity for the user to adjust the valve quickly enough anyway to avoid getting scalded at least slightly. It follows that if there is only a short run of scalding water that causes the thermostat to function in the way described, the thermostat brings the plugs back to their initial positions as soon as the hot water is again supplied at a moderate temperature. Thus, it is seen that the user does not have the bother of turning the valve one way or the other; these operations are taken care of automatically and at the proper instant under the control of the thermostat.

In the foregoing description I have confined myself to the specific construction disclosed in the drawing, but it should be understood that various changes might be made therein without departing from or sacrificing the more important advantages of my invention.

I claim as my invention:

1. In a mixing valve comprising a casing having inlet chambers and a mixing chamber communicating therewith through openings therebetween, the combination with valves for said openings and a manually rotatable threaded stem for operating said valves simultaneously in either direction, of an expansible thermostatic wafer interposed between said stem and said valves having a threaded connection with said stem on one face thereof and an operating connection with said valves on the other face thereof, said valves being guided for axial movement so that the wafer is held against turning, and a pair of coupling members within said wafer between the threaded connection of the one face and the operating connection of the other, the coupling members being rigid with the respective walls of said wafer and being axially movable with respect to one another while maintaining operative connection, whereby to permit free expansion and contraction of said wafer.

2. In a mixing valve comprising a casing having inlet chambers and a mixing chamber communicating therewith through openings therebetween, the combination with valves for said openings and a manually rotatable threaded stem for operating said valves simultaneously in either direction, of an expansible thermostatic wafer interposed between said stem and said valves having a threaded connection with said stem on one face thereof and an operating connection with said valves on the other face thereof, said wafer being normally of double concave form and being arranged when heated to a predetermined temperature to expand toward double convex form whereby to communicate movement to said valves, said valves being guided for axial movement so that the wafer is held against turning, and slidably interfitting coupling jaws inside said wafer, one of which is rigid with one face wall of said wafer and the other rigid with the other face wall of said wafer, said jaws being arranged to remain interengaged in all conditions of normal expansion of said wafer.

3. In a mixing valve comprising a casing having inlet chambers and a mixing chamber communicating therewith through openings therebetween, the combination with a plurality of graduating plugs slidably received in said openings, and a manually rotatable stem for transmitting axial movement to said plugs, of a cross-head for operating said plugs simultaneously in either direction, a collar threaded on said stem, and an expansible thermostatic wafer providing a semi-rigid, expansible connection between said collar and cross-head, said wafer serving normally to transmit the push and pull of the collar to the cross-head but being arranged when subjected to temperature variations to expand and contract so as to transmit push and pull movements to the cross-head independently of movement of said collar.

4. A device as set forth in claim 3 including an extension from said cross-head through one wall of said wafer, and another extension from said collar through the other wall, the one being slotted on the end thereof and the other having a key on the end thereof fitting slidably in said slot, whereby to transmit the torsional thrust on the collar to the cross-head and relieve the wafer of such strains incident to the turning of the stem in the collar in either direction.

5. In a mixing valve comprising a casing having inlet chambers for hot and cold liquid and a mixing chamber communicating therewith through openings therebetween, the combination of a pair of graduating valves for said openings, the one valve when moved in one direction serving to open up communication between the hot inlet chamber and the mixing chamber, and the other valve when moved in the same direction serving to close down communication between the cold inlet chamber and the mixing chamber, and vice versa, a manually operable member for moving said valves together simultaneously in either direction, said valves being closable by extreme movement in one direction, and thermostatic means providing a direct and substantially positive operating connection between said member and the two valves, whereby the same are arranged to be moved to closed position by extreme movement of said manually operable member or moved to a position of any desired extent of opening, said means being arranged when the valves are opened to communicate regulatory movement thereto to move said valves together simultaneously in one direction or the other independently of movement of said member for the purpose specified.

6. In a mixing valve comprising a casing having inlet chambers and a mixing chamber communicating therewith through openings therebetween, the combination of a manually operable member outside said casing, a plurality of graduating plugs slidably received in said openings inside the casing, a cross-head for moving said plugs simultaneously in either direction, and an expansible thermostatic element providing an operating connection between said manually operable member and said cross-head whereby to permit manual operation of said plugs in either direction as desired, said element being arranged under the effect of temperature change to communicate movement to said cross-head and plugs independently of movement of said manually operable member.

7. In a mixing valve comprising a casing having inlet chambers and a mixing chamber communicating therewith through openings therebetween, the combination of a manually operable member outside said casing, a plurality of graduating plugs slidably received in said openings inside the casing, said plugs being movable simultaneously in either direction, and an expansible theremostatic element providing an operating connection between said manually operable member and said plugs whereby to permit manual operation of said plugs in either direction as desired, said element being arranged under the effect of temperature change to communicate movement to said plugs independently of movement of said manually operable member.

In witness whereof I have affixed my signature.

HARRY CHARTRAND.